United States Patent [19]

Poetsch et al.

[11] Patent Number: 4,476,493
[45] Date of Patent: Oct. 9, 1984

[54] TELEVISION SCANNING OF MOTION PICTURE FILMS OF DIFFERENT FRAME ASPECT RATIOS

[75] Inventors: Dieter Poetsch, Ober-Ramstadt; Volker Massmann, Mühltal, both of Fed. Rep. of Germany

[73] Assignee: Robert Bosch GmbH, Stuttgart, Fed. Rep. of Germany

[21] Appl. No.: 366,935

[22] Filed: Apr. 9, 1982

[30] Foreign Application Priority Data

Apr. 16, 1981 [DE] Fed. Rep. of Germany ....... 3115367
May 29, 1981 [DE] Fed. Rep. of Germany ....... 3121308

[51] Int. Cl.³ .............................................. H04N 3/36
[52] U.S. Cl. ...................................... 358/214; 358/54
[58] Field of Search .................. 358/214, 54, 215, 216

[56] References Cited

U.S. PATENT DOCUMENTS 4,223,343 9/1980 Belmares-Sarabia ............... 358/214
4,310,856 1/1982 Poetsch ................................. 358/54
4,312,017 1/1982 Poetsch .............................. 358/214

Primary Examiner—Michael A. Masinick
Attorney, Agent, or Firm—Frishauf, Holtz, Goodman & Woodward

[57] ABSTRACT

Horizontally compressed video signals sensed in film scanning are transmitted at a slower rate for time expansion while the beginning of the transmission of each line is electronically delayed by an amount, constant at least for each picture field, which determines the centering of the narrower picture to be transmitted by television. This processing can be done before digitalization of the picture for storage, in the read-out of semiconductor sensors or it can be done after digitalization either before or after picture storing or partly before or partly after. In a preferred form a complete Cinemascope frame is stored in the picture store and both the time expansion and the picture shift are provided in the read-out of the picture store.

22 Claims, 8 Drawing Figures

TELEVISION SCANNING OF MOTION PICTURE FILMS OF DIFFERENT FRAME ASPECT RATIOS

This invention concerns methods and apparatus for motion picture film scanning for television transmission, and more particularly film scanning systems that must cope with the problem that some films which it is desired to broadcast have wide frames designed for wide screen projection which do not readily lend themselves to broadcast transmission for reception by receivers equipped with the picture tubes currently in use.

The known systems dealing with the problem just mentioned are mostly directed to suitably scanning the socalled "Cinemascope" films which are made by a process in which the picture exposures are compressed in the horizontal direction by a factor of 2:1 by means of an anamorphotic (image distorting) lens, so that a wide picture can be contained in the usual 35mm motion picture film format which has a width of 21.385mm and height of 18.2mm for the frame. When such pictures are projected, the horizontal expansion optically provided produces a ratio of width to height of 2.35:1. The picture screen television format, however, has an aspect ratio of 4:3, which is the same as 1.33:1. It is therefore not possible to scan "Cinemascope" films for television without compromises.

One known compromise consists in producing a format of 1.85:1, at the price of cutting off about 11% of the picture content at each side and leaving an annoying edge region without picture content on the picture screen above and below the reproduced picture.

In another known method, the film is shown in full picture height on the picture screen. No annoying edges then result, but now 22% of the picture content is cut off at each side of the picture. Since in these side locations there may be picture information important for the show, it became necessary to shift the center of attention horizontally during the scanning. Mechanical, optical or electronic methods can, in principle, serve such a purpose. Thus it is possible to produce the shift on the signal electrode of a storage tube film scanner by shifting of the projector or by rotation of mirrors or prisms. In flying spot scanners, it is possible to shift the scanning raster electronically.

In the case of a television film scanner using semiconductor line sensors, as described for example in DE-OS 292 1934, or semiconductor surface sensors, there is also the possibility of opto-mechanical methods as in the case of storage tube film scanners. These methods are mechanically cumbersome, however, subject to dust interference and likely to degrade the quality of optical imaging, and they do not permit the inertia-free change of position from one film picture to the next.

THE INVENTION

It is an object of this invention to shift horizontally the center of the scanned picture in television scanning of films designed for projection on wide films in a purely electronic manner to facilitate television viewing of the pictures in full height on the viewing screen and preferably to accomplish this in a manner in which film scanning equipment can readily be changed over by electrical switching from scanning normal motion picture films to scanning wide screen motion picture films, and back.

Briefly, the video signal is expanded by appropriate clocking of the rate of reading out from signal storage means, and the beginning and end of the read-out is selectively shifted, the end being automatically kept spaced from the beginning in accordance with the television standards. One possibility according to the invention is selective shift of the read-out at the beginning of each television line by a manual control, either with or without preprogramming. The beginning and the end of the read-out event can be represented by vertical lines on a picture screen on which the entire film picture is reproduced for guiding or checking the horizontal shift.

It is advantageous for these storage means to be line or surface sensors which have their contents read out at a clock frequency reduced by the expansion factor, whereas the picture store that stores the video signals of one film picture is controlled in write-in with the normal clock frequency corresponding to the television standard. It is also advantageous for the video signals delivered by the sensors to be digitalized and then expanded by means of a suitably clocked intermediate store of which the read-out rate is lower by the expansion factor than the write-in rate. In this case, the expansion of the digital video signal can be performed either before or after the storage of each film picture. When it is done after storing the picture, the beginning of the read-out from the picture store can be set picture by picture for each line, and the read-out data can be written into an intermediate store at a reduced clock frequency. Alternatively the beginning of the read-out from the picture store can be shifted forward by one line, and the read-out data put into a line store and read out therefrom at a reduced rate.

For the saving of storage capacity of the picture store, the video signal read out of the intermediate store can be interpolated on a picture point basis, so that between two picture points delivered by the intermediate store a third derived from these two is introduced. The thus interpolated video signal can be linewise interlaced, so that in the horizontal and vertical directions interpolated picture points are never adjacent to each other. It is also possible, for reducing the expansion factor and saving of storage capacity, to interpolate only every third picture point.

In a particularly advantageous procedure in which the video signals from the sensors are digitalized, the digitalized signals are written into a picture store that stores the complete cinemascope picture, after which they are read out at a reduced rate after shift of the beginning of the read-out.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
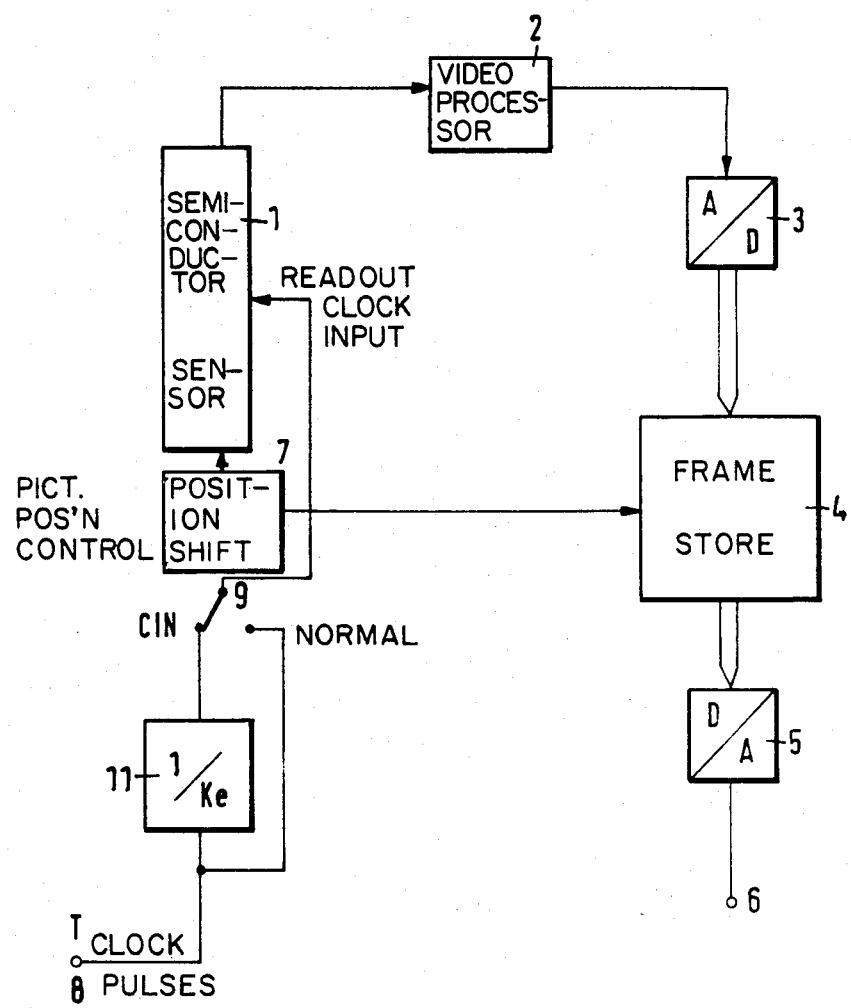
FIG. 1 is a block diagram for a circuit for expanding a video signal by means of a semiconductor sensor.

FIG. 1 shows the basic circuit of a film scanner equipped according to the invention. The unit designated 1 in the block diagram is a semiconductor photo sensor used for sensing successive frames of a motion picture film (not shown) through which light is caused to pass and then to impinge on the sensor 1. The sensor 1 can be a line sensor, in which case each frame must be scanned by movement of the image or of the sensor for sensing successive lines of the frame, or it may be a surface sensor by which all the points of a picture may be sensed at once by the equivalent of a mosaic of semiconductor elements and electronically scanned line by line to provide the video signal. For explanation of the present invention, only one sensor is shown in the block diagram, but of course the invention is applicable both to black and white pictures in which only one sensor is necessary and to color pictures in which scanning for television involves preferably three sensors on which light is projected after being passed through a color separation system to provide pictures in three different colors for incidence on the respective sensors. In the simplest case, then, the invention could be practiced by applying it to each of three color channels. Further reference to the applicability of the invention to film scanning for color television is mentioned below in connection with FIG. 2 and other figures of the drawing.

As shown in FIG. 1, the outward signals of the sensor 1 are supplied to a video processor 2 in which they are amplified and also usually subjected to various corrections well known in the color television transmission art that do not need to be further described. At the output of the video processor 2, the signals are still of an analog character. They are therefore next supplied to an analog-to-digital converter 3, because of the fact that digital signals are readily stored without loss of quality. The output of the converter 3 is supplied to the picture store 4 in which a full television picture is stored. In the case of color television, as further mentioned below, the color information is also stored at this stage. The digital television signals are then read out of the picture store 4 at a rate corresponding to the television signal standard applicable to the intended broadcast or cable transmission and the reconverted to analog form by the digital-to-analog converter 5 to provide television signals at the terminal 6 for further transmission.

The scanning control of the sensor 1 is produced by means of control signals that are generated by a position shift circuit 7 that may be referred to as a picture center shift circuit or a picture frame shift circuit. And, in addition, by the clock pulses T available at the terminal 8 to which a clock pulse generator (not shown) forming part of the usual studio equipment is connected. For the scanning of normal motion picture film, the clock pulses from the terminal 8 are connected directly through the changeover switch 9 to the read-out timing input of the sensor 1. In the case of scanning Cinemascope film with picture section shift, the pulses from the terminal 8 are passed through a frequency division stage 11, and the lower frequency pulses are then furnished through the switch 9 to the read-out timing input of the sensor 1.

The full width of the picture of a frame of Cinemascope motion picture film is projected or otherwise imaged on the sensor 1 when Cinemascope motion pictures are scanned, thus providing for sensing a picture having the aspect ratio or format of 2.35:1. It is then necessary to control the read-out so as to produce a picture section shift (i.e., picture sensing) to determine which part of the width of the film will be stored in the picture store 4. When the sensor 1 is a line sensor, the horizontal synchronizing pulse is utilized to shift the loading of the entire line in the transport region of the sensor 1. In other words, a horizontal synchronizing signal having a delay corresponding to the desired shift is generated in the circuit 7. When there is no delay, the picture that is stored is a section at the side of the widescreen picture at which the line scanning begins, and the largest delay is used to store (and transmit) the picture section of the desired television format at the other side of the widescreen picture.

According to the invention, the read-out rate of the picture points sensed by the sensor 1 is reduced when a Cinemascope picture is being sensed, and this reduction of the read-out rate is performed by the frequency divider 11 which reduces the repetition rate of the pulses present at the terminal 8 by a factor $K_e$ (for example $K_e = 1.76$), providing an output having a repetition rate of $1/K_e \cdot f_t$, thus for the example just mentioned $f_t/1.76$. Since the digitalization of the signal in the converter 3 and the storing of the digital signals representing the successive picture points in the picture store 4 both proceed at the normal clock frequency corresponding to the television transmission system, only a part of the picture points sensed in the sensor 1 will be stored for each television line in the picture store 4 as an active line of the stored picture. The shift of the picture sections stored is produced by means of the position shift circuit 7 which determines the shift of the read-out start point for the transport region of the sensor and of the write-in start point for the picture store 4, providing corresponding pulses for the sensor 1, as shown in FIG. 1.

Figure 2:
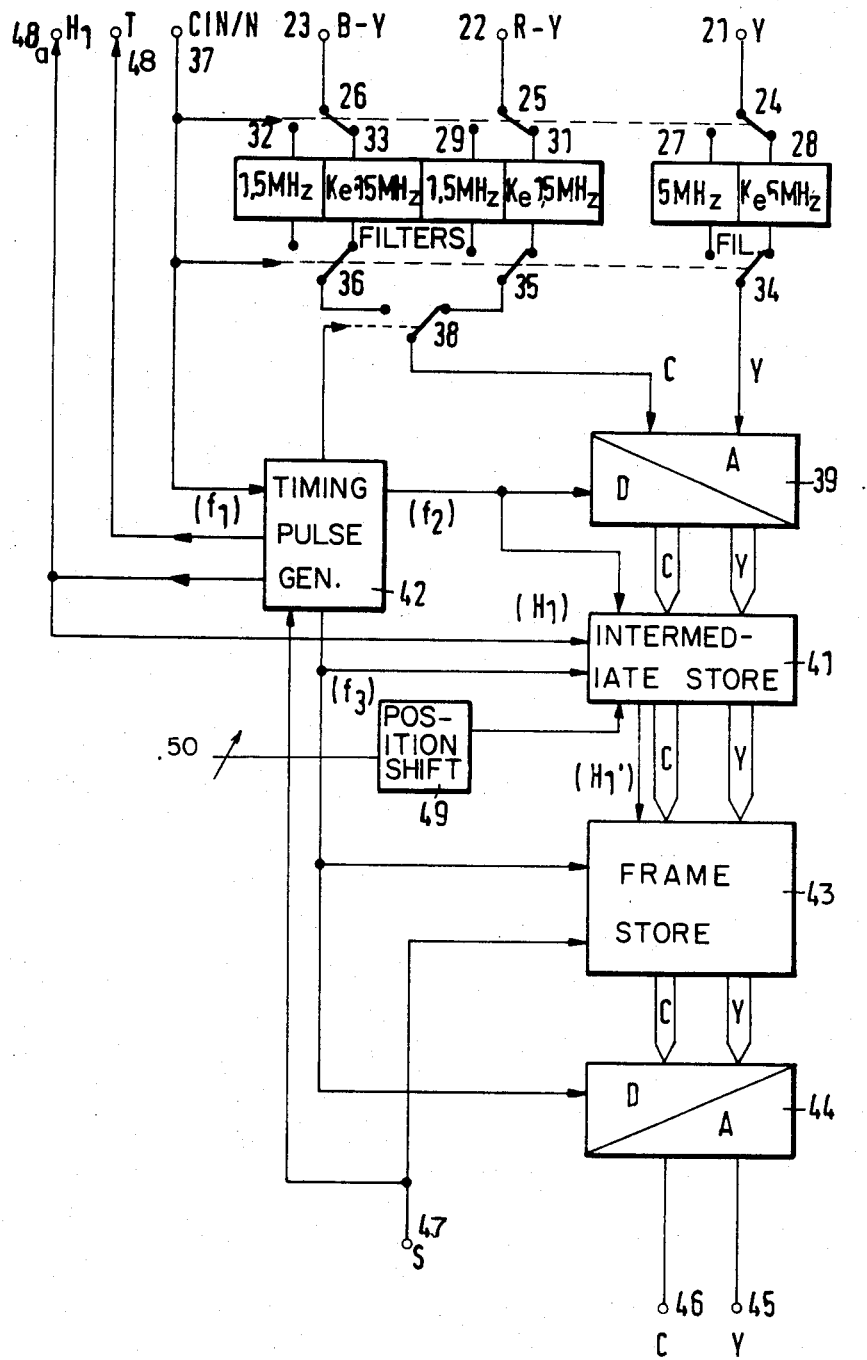
FIG. 2 is a block diagram of a circuit for expansion of the video signal before picture storage.

The time expansion of the video signal in accordance with the invention can take place either before or after the storing of the picture. FIG. 2 shows a portion of a system operating according to the basic principle shown in FIG. 1, as utilized in the scanning of a widescreen picture for color picture transmission. The time expansion and shift in this case, instead of being produced in the read-out of the sensors (of which three are normally required for color television) is produced with the help of an intermediate store. The semiconductor sensors which respectively produce the primary color signals R, G and B are not shown in FIG. 2, and likewise the matrix in which the luminance signal Y and the two color difference signals R-Y and B-Y are derived from the primary color signals is not shown. These signals Y, R-Y and B-Y are shown in FIG. 2 as being available at the respective terminals 21, 22 and 23. The changeover switches 24, 25 and 26 at the input sides of the respective low-pass filter pairs 27, 28; 29, 31 and 32, 33, as well as the changeover switches 34, 35 and 36 at the output sides of these filters are controlled from the terminal 37 by a signal that determines whether a Cinemascope film or a normal film is being scanned. These switches are shown in the Cinemascope position. The terminal 37 also controls outputs of the timing pulse generator 42, as further described below. Filter bandwidths broader by a factor $K_e$ are necessary for Cinemascope signals in order to preserve the 5MHz bandwidth of the Cinemascope signals.

As shown in FIG. 2, the luminance signal Y and one of the color difference signals selected by the alternating switch 38 controlled by the clock pulse generator 42 are furnished to the analog-to-digital converter 39. The color difference signal connected at the moment to the arm of the switch 38 is identified in FIG. 2 as the signal C. The digitalized signals C and Y are supplied by the output of the converter 39 to an intermediate store 41. The write-in rate of these signals into the store 41 and the digitalizing rate at which the analog signals are converted in the converter 39 both correspond to the frequency $f_2$ which is one of the outputs of the timing pulse generator 42, which is synchronized to the studio synchronizing pulses by means of pulses available at the terminal 47.

The reading out of the digital video signals from the intermediate store 41 proceeds in step with a reduced frequency $f_3 = 1/K_e \cdot f_2$ in order to provide a time expansion factor $K_e$ for the signals. The picture store 43 into which the signals from the intermediate store 41 are written is clocked for write-in at the frequency $f_3$, but has its read-out synchronized by the studio synchronization signals from the terminal 47. The read-out also proceeds at the $f_3$ rate, and the following conversion to analog form in the converter 44 is likewise clocked at the $f_3$ rate.

The timing pulse generator 42 also provides the clock signals T necessary for read-out of the semiconductor sensors not shown in FIG. 2 at a frequency $f_1 = f_T$. The timing pulse generator 42 supplies the timing pulses T at the terminal 47 and also supplies the horizontal pulses $H_1$ necessary for the operation of the semiconductor sensors to the terminal 48, as well as also to the intermediate store 41 and to the position shift circuit 49. The circuit 49, which has a control symbolically shown at 50 for shifting the section of the widescreen picture to be stored, provides an output in the form of a delayed horizontal pulse for determining the start of storage for each line in the intermediate store 41 and it is the line contents thus selected that determine the lines stored in the picture store 43. The circuit 49 may be controlled either manually or in some automatic way, for example from some previously prepared programming means, the content of which is based on a previous viewing of the film, by the control 50.

The circuit 49 causes the start of transfer to the store 43 of a television line readout from the store 41 to begin at a moment ($H_1$) at or after the start of readout, and the ($H_1$) signal is connected to the store 43 to start storage of a line there, which continues until the storage capacity allocated in the store 43 to a line is filled up.

Figure 3:
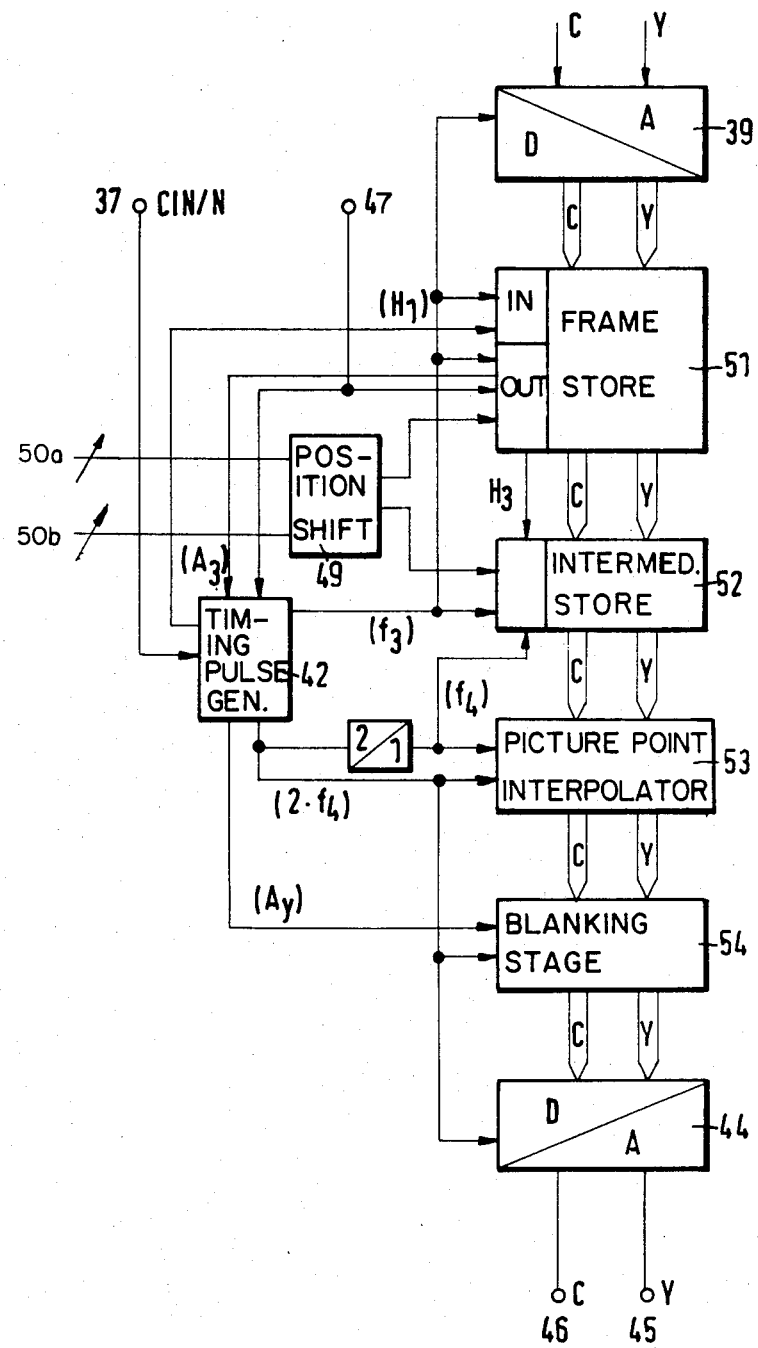
FIG. 3 is a block diagram of a circuit for expansion of a video signal after read-out from a picture store.

FIG. 3 illustrates an embodiment of the invention in which the position shift determining the section of the picture that will be transmitted for television is provided after the storage of the digitalized video signals of a picture. The portions of this circuit that are identical with corresponding portions of FIG. 2 are given the same reference numerals, and other portions and connections of FIG. 2 which need not be changed for the circuit of FIG. 3 are entirely omitted in FIG. 3 to simplify the illustration. Thus the portions of FIG. 2 relating to reference numerals 21 through 38 are omitted.

The luminance signal Y and the color difference signal C are both supplied to the analog-to-digital converter 39 as in FIG. 2. The digital output signals of the converter 39 in this case go to a picture store 51, for which both the write-in and read-out are clocked at the same timing frequency $f_3$ with which the analog-to-digital converter 39 is clocked. This frequency $f_3$ also times the input into the intermediate store 52 of the signals read out of the picture store 51.

The read-out from the intermediate store 52 is produced at a reduced rate by pulses of the frequency $f_4 = f_3/K_e$ to provide a time expansion by the factor $K_e$. In this case the position shift signals from the circuit 49 are applied already at the read-out from the picture store 51 in accordance with a coarse control 50a and a supplementary position shift is provided in the intermediate store 52 in response to a fine control 50b which controls the write-in into the intermediate store 52.

The signals read out from the intermediate store 52 are supplied to a picture point interpolator 53 where the data rate is doubled. In this interpolator 53, a third picture point for insertion between each pair of succeeding picture points is generated from the values of the two adjoining picture points. The resulting interpolated video signals are then supplied to a blanking stage 54 which is necessary because the video signals stored in the picture store 51 are still compressed horizontally as a result of which their blanking interval between lines does not fit the blanking interval of a standard television signal. The blanking signal $A_3$ is therefore taken from the picture store 51 and supplied to the timing pulse generator 42 which processes that signal in order to deliver a blanking signal $A_4$ conforming to the television transmission standard to the blanking stage 54. The output of that stage then is subject to conversion into analog signals by the converter 44 in order to deliver analog signal components Y and C at the terminals 44 and 45 together providing a suitable expanded video signal.

Figure 4:
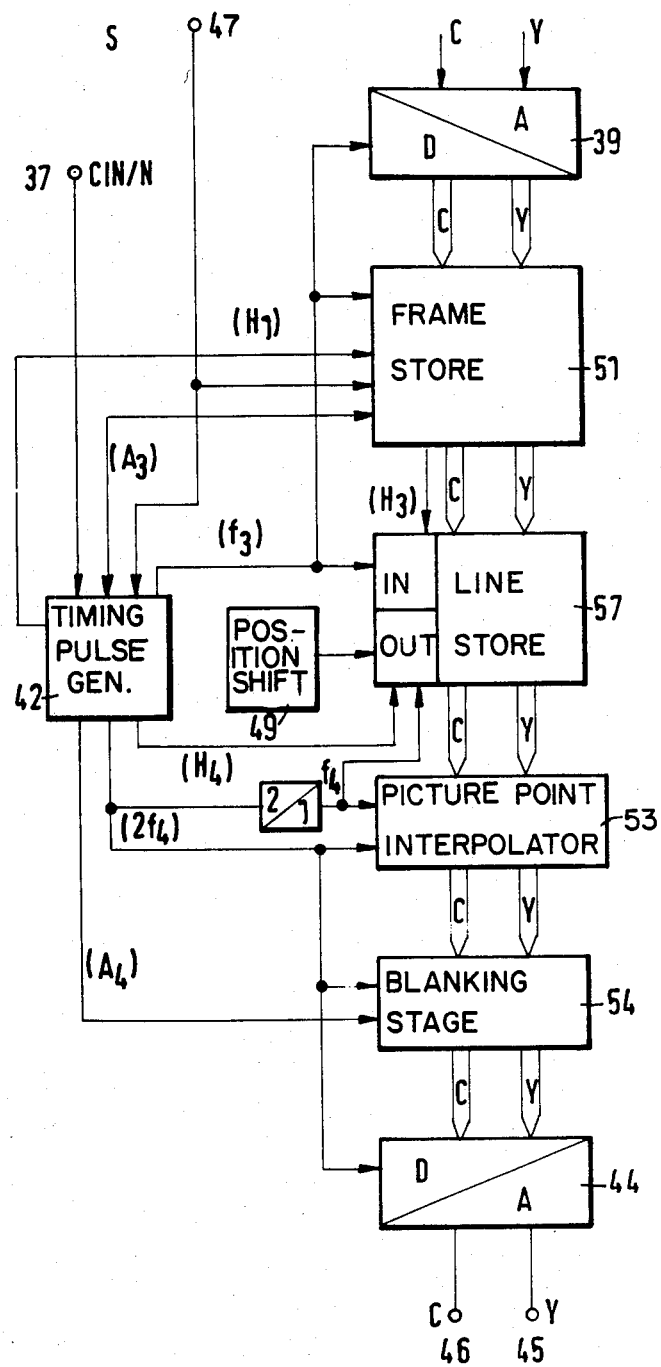
FIG. 4 is a block diagram of a circuit for expansion of the video signal by means of a line store after picture storage.

The circuit shown in FIG. 4 differs from that of FIG. 3 in that a line store 57 is provided instead of the intermediate store 52 of FIG. 3. The video signal digitalized in the converter 39 and composed of the components Y and C is read into the picture store 51. The read-out from the picture store 51 takes place with a forward shift by one line for loading the store 57. The processing of the video signals in the circuits 39 and 51, as well as the input into the line store 57, is carried out in step with the same timing frequency $f_3$. The expansion of the video signal is performed upon reading out from the line store 57. That read-out takes place at the lower clock frequency $f_4 = f_3 \cdot 1/K_e$ in order to provide a time expansion by a factor $K_e$.

The position shift is again provided by the circuit 49 which determines the portion of the line that will be read out from the line store 57. The output from the line store 57 again goes to a picture point interpolator 53 operating like the similarly identified interpolator of FIG. 3 which picks up the stored picture points at the frequency $f_4$.

As in the case of FIG. 3, the data rate is doubled in the picture point interpolator 53, so that the following blanking stage 54 and the digital-to-analog converter 44 must be controlled by the frequency $2f_4$, which is twice the interpolator input frequency. A time-expanded and appropriately position shifted picture signal is then again available in analog form at the terminals 45 and 46.

Figure 5:
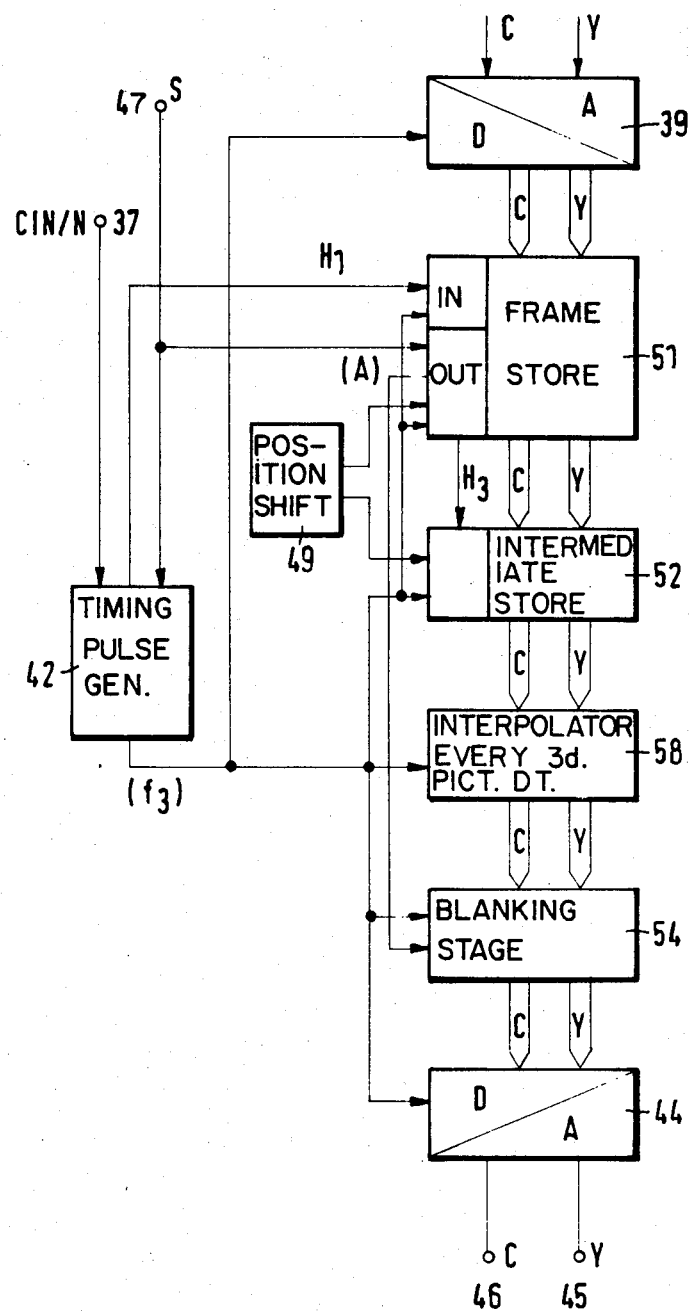
FIG. 5 is a block diagram of a circuit for reduced expansion of the video signal after picture storage.

In the circuit of FIG. 5, the video signals Y and C available at the analog-to-digital converter 39 are already expanded by optical or electronic methods by the factor 1.18. After digitalization, these time-expanded video signals are put into the picture store 51 and then, at the same timing frequency $f_3$, read out of the store 51 and written into the intermediate store 52.

The position shift is again produced by the circuit 49 in the read-out from the picture store 51 and supplementarily in the writing-in of the signals into the intermediate store 52. The video signals are read out of the intermediate store 52 in such a way that in the following interpolator 58, a third picture point can be inserted every time after two original picture points have been provided, the value of the third picture point being obtained by interpolation between the values of the neighboring picture points. With this circuit, therefore, an expansion in the ratio of 1:1.5 is possible. The further processing takes place as already described in the blanking stage 54 and in the digital-to-analog converter 44. At the terminals 45 and 46, video signals Y and C are available, which have the desired time-expansion of 1:1.77.

Figure 6:
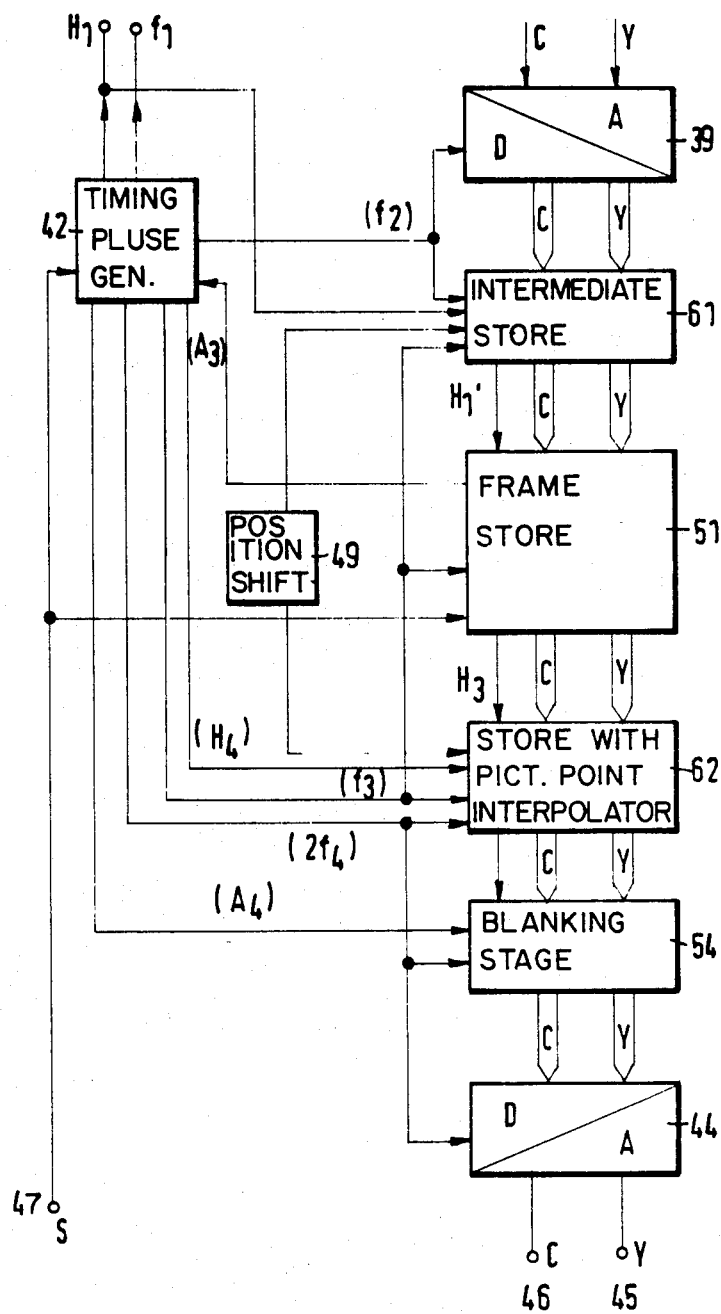
FIG. 6 is a block diagram of a circuit for expansion of the video signal before and after picture storage.

In the circuit shown in FIG. 6, expansion of the video signal is provided both before and after storage in the picture store 51. The video signal present in the analog-to-digital converter 39 can therefore be expanded already in the intermediate store 61 in the case of running the film at normal speed (24 or 25 frames per second, forward), after which the video signal is further processed in the manner described in connection with FIG. 2. That has the advantage that without widening of the picture store 51, a high resolution is available.

The other possibility, namely the possibility of expanding the video signal after picture storage, is preferably utilized when the film is to be scanned in stop-frame operation or in slowed-down search operation. A jumping of the picture by carrying out the position shift by the use of the circuit 49 is thus prevented. The expansion by means of the intermediate store 62, which also contains a built-in picture point interpolator, is carried out in the manner described in connection with FIG. 3, FIG. 4 or FIG. 5. Expanded video signals Y and C, which have been expanded in time according to the manner of operation of the film scanner, before or after picture storage, are thereby available at the output terminals 45 and 46.

Figure 7:
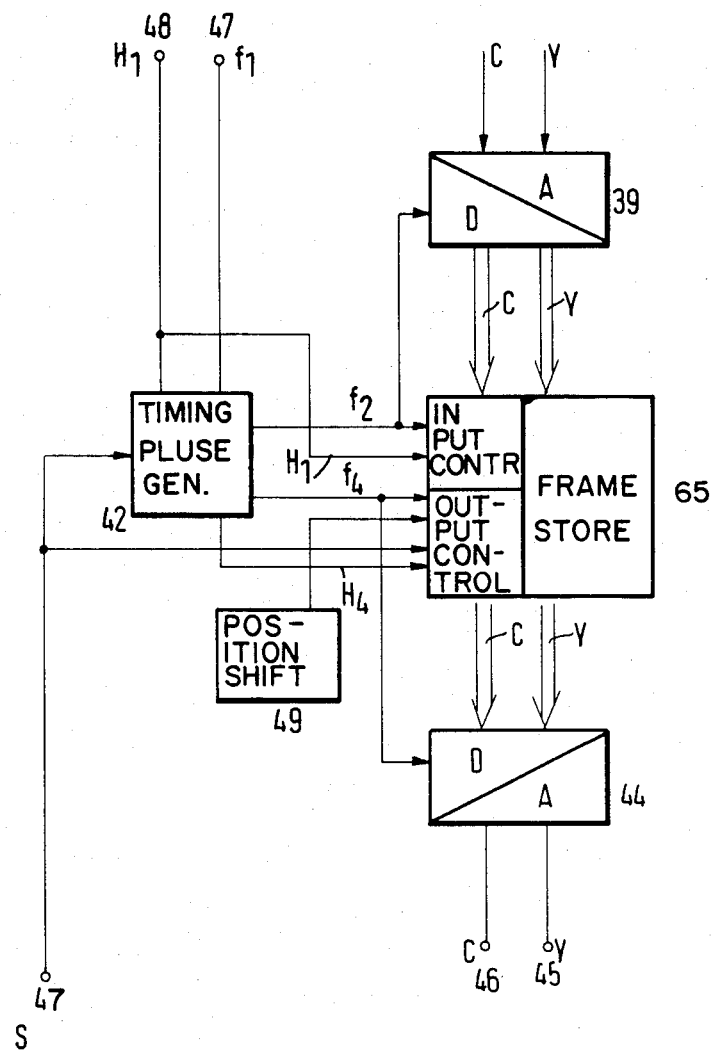
FIG. 7 is a block diagram of a circuit utilizing a picture store capable of storing a complete cinemascope picture.

In the circuit of FIG. 7, the expansion of the digital video signals is produced in a picture store 65 that accepts a complete Cinemascope picture. The video signals Y and C, after digitalization in the converter 39, are supplied to the picture store 65, being written in at the same timing frequency $f_2$ with which the converter 39 is operated. The read-out of the video signals from the picture store 65 provides time-expansion by the factor $K_e$ and is produced by a correspondingly reduced read-out frequency $f_4 = 1/K_e \cdot f_2$ at which the digital-to-analog converter 44, also, is operated. The analog video signal formed of the components Y and C is accordingly available at the output terminals 45 and 46.

The timing frequencies $f_2$ and $f_4$ are provided by the timing pulse generator 42 which, again, is synchronized by studio synchronizing pulses S furnished from the terminal 43. The timing pulse generator 42 also supplies timing signals of the frequency $f_1$ necessary for read-out from the semiconductor sensors not shown in the drawing, as in the case of the other figures. FIG. 7, like FIG. 2, shows these timing signals being provided to the terminal 48 and also the provision of horizontal pulses $H_1$ at the terminal 48a, likewise for use by the semiconductor sensors.

The position shift of the picture section to be transmitted by television is produced by the selection of the picture points of the picture store 65 by means of a position shift circuit 49 which controls where the read-out of each line beings and is controlled, as in the case of the other figures, either by manual or automatic setting of a timing adjustment.

The advantage of the arrangement of FIG. 7 is that the number of individual storage devices, such as a line store or an additional intermediate store, is made unnecessary.

For interlacing of interpolated picture points, the interpolation can be carried out differently on alternate lines. This can be illustrated readily for the case of doubling of the data rate. In that case, in one set of alternate lines, the first interpolated point will be between the first and second original points of the line, whereas in the second set of lines the first interpolated point will be between the second and third original points of the line. Other methods of interpolation to provide interlacing can readily be devised.

Although the invention has been described with reference to particular illustrative embodiments, it will be recognized that further variations and modifications are possible within the inventive concept.

Thus, it is clear from FIG. 7 that the position shifting circuit 49, instead of timing the start of transfer of signals at the reduced clock rate from the picture store 65 to the converter 44, can set the address of the picture point at which each line read-out starts and the address at which each line readout stops. In this case each line is stored with a complete set of picture point addresses. In other words, a controllable offset can be an offset in time of start or an offset in address of start of readout.

Figure 8:
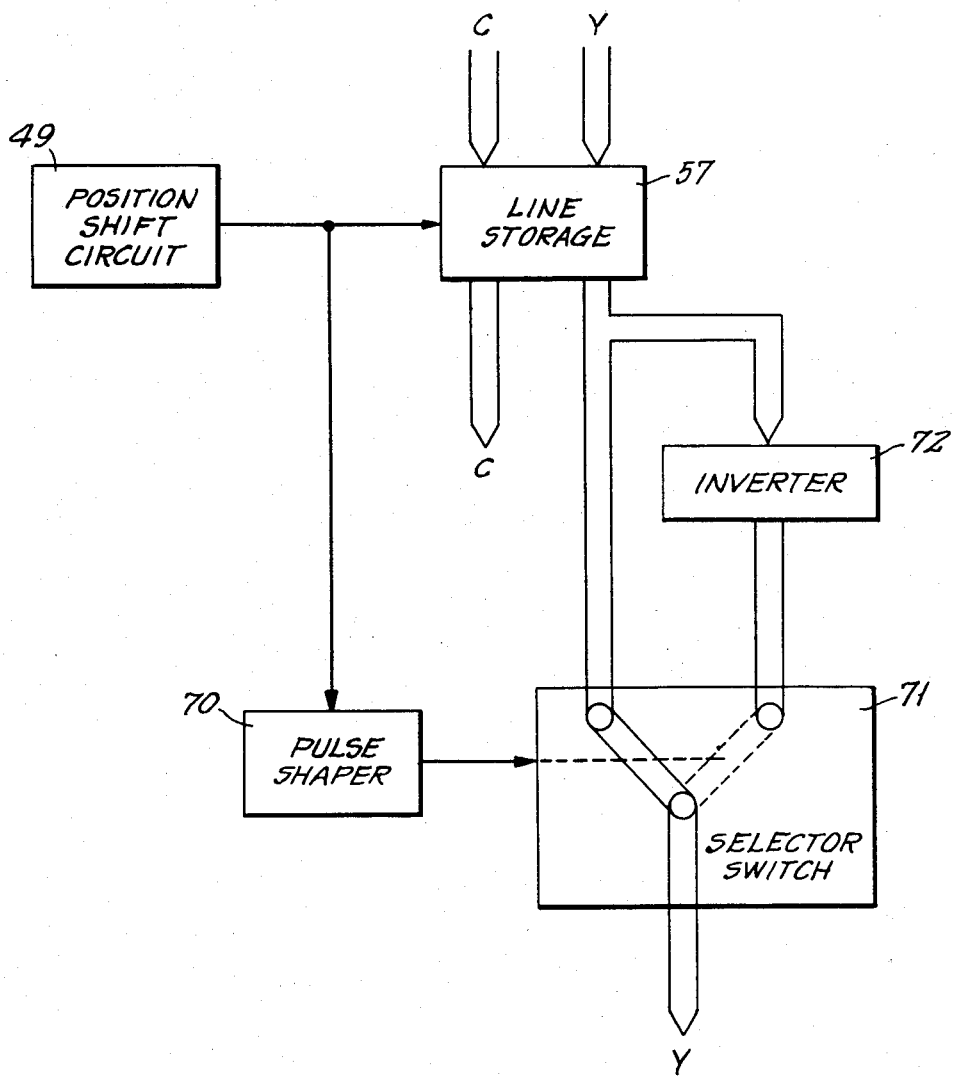
FIG. 8 is a block diagram of a circuit for generating vertical lines on the screen designating the end and beginning of the readout operation.

In FIG. 8 is shown a circuit for generating the vertical lines which designate the end and the beginning of the readout operation on the screen reproducing the entire film picture. For this purpose, the position shift circuit 49, besides being connected to the line store 57, is connected further with a borderline pulse shaper 70, the output of which is connected to the control input of a selector switch 71. The output for the luminance signal Y of the line store 57 is on the one hand connected directly, and on the other hand connected through an inverter unit 72, to the respective signal inputs of the selector switch 71. The two vertical boundary lines are now generated by switching over selector switch 71 from the non-inverting to the inverting luminance signal Y. This switching over takes place with the help of the pulses generated in the borderline pulse shaper 70 which are influenced by the position shift circuit 49. The boundary lines are thus generated by the repeated inverting of the luminance signal Y at the corresponding location in every line of the reproduction screen. If for example the luminance signal Y is bright at this location, it will be reproduced dark and vice versa.

We claim:

1. Method of scanning motion pictures intended for projection on a wide screen in order to produce television signals by exposing successive frames of said motion pictures on semiconductor light sensing means and line-sequentially reading out from said sensing means video signals representing said successive motion picture frames, said method comprising the steps of:

time expanding video signals derived from the output of said sensing means to an extent compensating for the optical horizontal compression of the pictures on said film, and selecting for television transmission a portion of the time-expanded signals corresponding to each television line by providing a controllable offset in the beginning of read-out of video signals of said line and cutting off read-out of said video signals of said line after a predetermined interval after said beginning, said controllable offset being constant for each picture frame.

2. Method as defined in claim 1 in which the step of selection by controllable offset is performed with manual control means.

3. Method as defined in claim 1 in which the step of selection by controllable offset is performed at least in part by use of previously prepared programming means.

4. Method as defined in claim 2 or claim 3 which also comprises the steps of:
producing on a viewing screen a complete view of the wide screen motion picture while the scanning method is being performed, and
producing vertical lines on said complete view corresponding to the edges of said portion of said time expanded signals selected for television transmission, in response to the momentary setting of said means used to control said controllable offset.

5. Method as defined in claim 1 in which the step of time expanding said video signals is performed by reading said video signals out of said sensing means at a sufficiently low rate and said controllable delay is applied to the start of read-out of every line from said sensing means and said predetermined interval is the television line tracing interval, and in which method there are also performed the steps of digitizing said video signals, storing them in a picture store and reading them out of said picture store at a rate conforming with a television signal transmission standard.

6. Method as defined in claim 1 in which said video signals derived from the output of said sensing means are digitized before said time expanding step is performed, in which the time expansion step is performed by writing said digitized video signals into intermediate signal storage means (41; 52; 61, 62) at a first digital signal sequence rate and reading said signals out of said intermediate signal means at a second digital sequence rate which is lower than said first digital signal sequence rate, and in which said selection step performed by controllable offset is performed by applying said offset to the read-out of signals from said intermediate storage means.

7. Method as defined in claim 6 in which said digitized video signals are subjected to a step of storage in picture storage means distinct from said intermediate signal storage means, and in which said step of storage in said picture storage means is performed for said digitized signals after they have been time expanded.

8. Method as defined in claim 6 in which said digitized video signals are subjected to a step of storage in picture storage means distinct from said intermediate signal storage means, and in which said step of storage in said picture storage means is performed for said digitized signals before they are time-expanded.

9. Method as defined in claim 8 in which transfer of said digitized signals from said picture storage means to said intermediate storage means is performed picture by picture.

10. Method as defined in claim 8 in which said intermediate storage means is a line storage means and in which transfer of said digitized signals from said picture storage means to said intermediate storage means is performed by advancing the read-out from said picture storage means by one line.

11. Method as defined in claim 6 in which said digitized video signals are subjected to a step of storage in picture storage means distinct from said intermediate signal storage means, and in which said step of storage in said picture storage means is performed for said digitized signals before they are time-expanded for motion picture showing at normal forward speed of operation and is performed after said digitized signals are time expanded at least in the cases of stop-frame and search-type showing of motion pictures.

12. Method as defined in claim 9, which further includes the step of interpolating digital signals of additional picture points between every two picture point signals of the same line successively read out from said intermediate storage means, the value of the interpolated points being derived by the values of the points between which it is interpolated, whereby storage capacity is economized.

13. Method as defined in claim 9, which further includes the step of interpolating digital signals of additional picture points between substantially every two picture point signals of the same line successively read out from said intermediate storage means in a manner interlacing the position of interpolated points in successive lines to avoid vertical as well as horizontal juxtaposition of interpolated points.

14. Method as defined in claim 9, which further includes the step of interpolating, at regular intervals, a new digital signal of an additional point for every two picture point signals of the same line successively read out from said intermediate storage means, in a manner interlacing the position of interpolated points in successive lines to avoid vertical as well as horizontal juxtaposition of interpolated points.

15. Apparatus for converting electrical video signals produced by a motion picture film scanner from a film bearing horizontally compressed motion pictures into video signals capable of producing television signals conforming with a television transmission standard and capable of picture reproduction substantially filling a normal receiver picture screen, comprising:
means (39) for converting said electrical video signals as produced by said scanner into digital signals;
first storage means (41) for storing a multiplicity of television lines of said digital signals, having an input and an output, said input being connected to the output of said converting means;
second storage means (43) for storing digital signals obtained from the output of a said first storage means and corresponding to a television picture to be transmitted, having an input and an output, said input being connected to the output of said first storage means and said output providing television signals for further processing for transmission;
timing pulse generating means for timing the rate of digital signal production of said converting means and the rate of writing in said digital signals into said first storage means at a first signal rate (f2) and for timing the rate of reading said digital signals out of said first storage means and into and out of said second storage means at a second signal rate (f3), said second signal rate being slower by a factor that compensates for the horizontal compression of said motion pictures, and variably settable means (49) for television picture frame shifting horizontally by offsetting the start of the transfer of digital signals read out from said first storage means for each television line at a controllable offset from the beginning of the stored line, said second storage means being connected ($H_1$) for starting the storage of digital signals of a television line with the start of transfer of signals from said first storage means and ceasing the storage of digital signals of said line when the storage capacity of said second storage means allocated to a television line is filled.

16. Apparatus as defined in claim 15, in which said first storage means has capacity for storing all the television lines of a picture.

17. Apparatus for converting electrical video signals produced by a motion picture film scanner from a film bearing horizontally compressed motion pictures into video signals capable of producing television signals conforming with a television transmission standard and capable of picture reproduction substantially filing a normal receiver picture screen, comprising:

means (39) for converting said electrical video signals as produced by said scanner into digital signals;

first storage means (51) for storing the digital signals corresponding to a picture, having an input and an output, said input being connected for receiving digital signal from said converting means;

second storage means (52) for storage of picture elements represented by said digital signals, having an input and an output, said input being connected to the output of said first storage means;

picture point interpolator means (53) for substantially doubling the data transmission rate of the output of said second storage means, having an input and an output, said input being connected to the output of said second storage means;

blanking interval correction means (54) for providing blanking intervals conforming to a television transmission standard in the output of said interpolator means, having an input and an output, said input being connected to the output of said interpolator means and said output providing television signals for further processing for transmission;

timing pulse generator means (42) for timing the rate of digital signal production of said converting means and the rate of writing in and reading out of said digital signals for said first storage means, as well as the rate of writing them into said second storage means, at a first signal rate ($f_3$), for timing the rate of readout of said digital signals from said storage means at a second signal rate ($f_4$) slower than said first signal rate by a factor compensating for the horizontal compression of said motion pictures, and for timing the blanking intervals produced in said blanking interval correcting means (54) with reference to blanking interval signals obtained from the output of said first signal storage means, and variably settable means (49) for television picture frame shifting horizontally by offsetting the start of transfer into said second storage means of digital signals read out from said first storage means.

18. Apparatus as defined in claim 17, in which said second storage means (52) is picture elements storage means.

19. Apparatus as defined in claim 18, in which said variably settable frame shifting means is connected to apply a coarse shift signal for offsetting readout from said first storage means and a fine shift signal for offsetting write-in into said second storage means.

20. Apparatus for converting electrical video signals produced by a motion picture film scanner from a film bearing horizontally compressed motion picture video signals capable of producing television signals conforming with a television transmission standard and capable of picture reproduction substantially filling a normal receiver picture screen, comprising:

means (39) for converting said electrical video signals as produced by said scanner into digital signals;

first storage means (51) for storing the digital signals corresponding to a picture, having an input and an output, said input being connected for receiving digital signals from said converting means;

second storage means (57) for storage of said digital signals of a television line and having an input and an output, said input being connected for receiving digital signals advanced by one line from said first storage means;

picture point interpolator means (53) for substantially doubling the data transmission rate of the output of said second storage means, having an input and an output, said input being connected to the output of said second storage means;

blanking interval correction means (54) for providing blanking intervals conforming to a television transmission standard, in the output of said interpolator means, having an input and an output, said input being connected to the output of said interpolator means and said output providing television signals for further processing for transmission;

timing pulse generator means (42) for timing the rate of digital signal production of said converting means and the rate of writing in and reading out of said digital signals for said first storage means, as well as the rate of writing them into said second storage means, as well as the rate of writing them into said second storage means, at a first signal rate ($f_3$), for timing the rate of readout of said digital signals from said second storage means at a second signal rate ($f_4$) slower than said first signal rate by a factor compensating for the horizontal compression of said motion pictures, and for timing the blanking intervals produced in said blanking interval correcting means (54) with reference to blanking interval signals obtained from the output of said first signal storage means, and variably settable means (49) for television picture frame shifting horizontally by offsetting line by line the start of transfer to said interpolator means of signals addressable successively for readout from said second storage means.

21. Apparatus for converting electrical video signals produced by a motion picture film scanner from a film bearing horizontally compressed motion pictures into video signals capable of producing television signals conforming with a television transmission standard and capable of picture reproduction substantially filling a normal receiver picture screen, comprising:

means (39) for converting said electrical video signals as produced by said scanner into digital signals;

first storage means (51) for storing the digital signals corresponding to a picture, having an input and an output, said input being connected for receiving digital signals from said converting means;

second storage means (52) for storage of picture elements represented by said digital signals, having an input and an output, said input being connected to the output of said first storage means;

picture point interpolator means for increasing by substantially 50% the data transmission rate of the output of said second storage means, having an input and an output, said input being connected to the output of said second storage means;

blanking interval correction means (54) for providing blanking intervals conforming to a television transmission standard, in the output of said interpolator means, having an input and an output, said input being connected to the output of said interpolator means and said output providing television signals for further processing for transmission;

timing pulse generator means (42) for timing the rate of digital signal production of said converting means and the rate of writing in and reading out of said digital signals for said first storage means, as well as the rate of writing them into said second storage means, at a first signal rate ($f_3$), for timing the rate of readout of said digital signals from said second storage means at a second signal rate ($f_4$) slower than said first signal rate by a factor compensating for the horizontal compression of said motion pictures, and for timing the blanking intervals produced in said blanking interval correcting means (54) with reference to blanking interval signals obtained from the output of said first signal storage means, and variably settable means (49) for television picture frame shifting horizontally by offsetting the start of transfer into said second storage means of digital signals read out from said first storage means.

22. Apparatus for converting electrical video signals produced by a motion picture film scanner from a film bearing horizontally compressed motion pictures into video signals capable of producing television signals conforming with a television transmission standard and capable of picture reproduction substantially filling a normal receiver picture screen, comprising:

means (39) for converting said electrical video signals as produced by said scanner into digital signals;

digital signal storage means (65) for storing digital signals representing an entire picture frame of said film having an input and an output, said input being connected to said converting means for receiving digital signals therefrom and storing the same and said output providing television signals for further processing for transmission;

timing pulse generating means (42) for timing the rate of digital signal production of said converting means and the rate of writing in said digital signals into said storage means at a first signal rate ($f_2$) and for timing the rate of reading said digital signals out of said storage means at a second signal rate ($f_4$) slower than said first signal rate by a factor that compensates for the horizontal compression of said motion pictures, and variably settable means (49) for television picture frame shifting horizontally with respect to said motion picture frame by offset of the start and finish address for reading out digital signals from said storage means for each television line.

* * * * *